Nov. 15, 1927.   1,649,787
F. A. STEVENS
SPECTACLE TEMPLE AND METHOD OF MAKING THE SAME
Filed Sept. 1, 1921
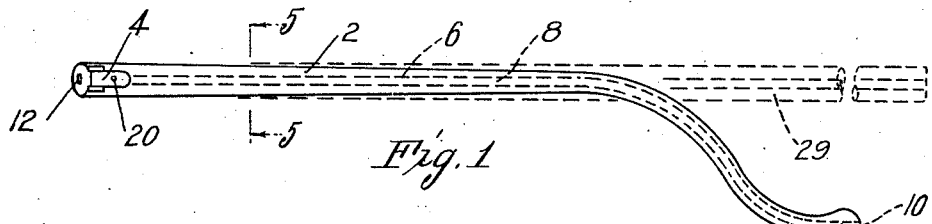
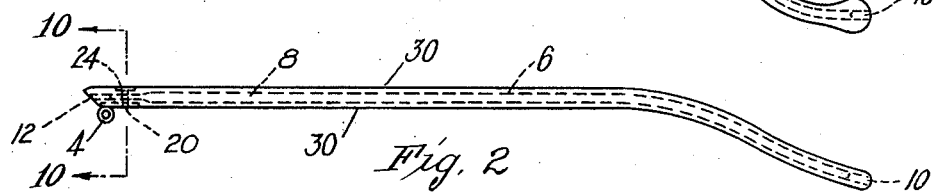
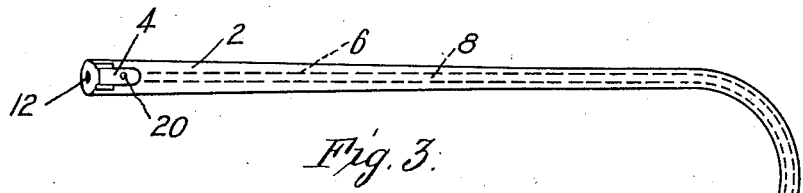
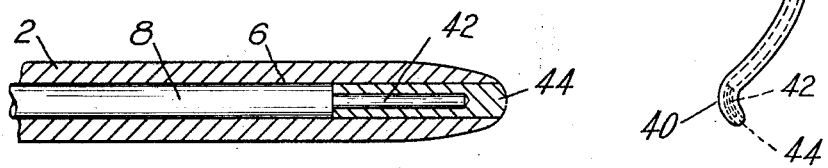
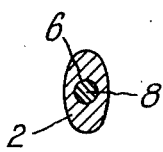 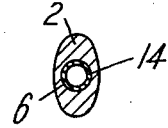 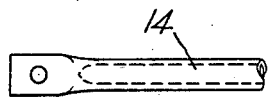 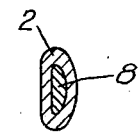
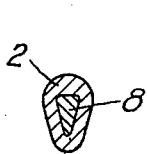 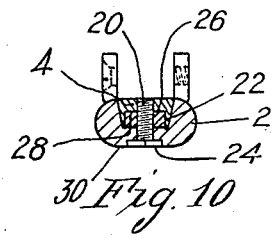
Inventor
Frederick A. Stevens.
By David Rines
Attorney Patented Nov. 15, 1927.

1,649,787

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

SPECTACLE TEMPLE AND METHOD OF MAKING THE SAME.

Application filed September 1, 1921. Serial No. 497,640.

The present invention relates to ophthalmic mountings and methods of making the same, and though certain features thereof are applicable to other mountings, the invention relates more particularly to spectacle temples.

The chief object of the invention is to provide a new and improved spectacle temple of the non-metallic type that shall be stronger, lighter, more endurable and more efficient than any heretofore proposed.

In the accompanying drawings, Fig. 1 is a side elevation of a spectacle temple constructed according to a preferred embodiment of the present invention showing in dotted lines a non-metallic tube from which the non-metallic member of the temple may be constructed; Fig. 2 is a plan view of the same; Fig. 3 is a side elevation of a modification; Fig. 4 is a longitudinal section of the end of the temple shown in Fig. 3 before it is bent into shape; Fig. 5 is a section, taken upon the line 5—5 of Fig. 1; Fig. 6 is a similar section of a modification; Fig. 7 is a fragmentary view of the hollow reinforcing member shown in Fig. 6; Figs. 8 and 9 are sections similar to Figs. 5 and 6 of further modifications; and Fig. 10 is a section of a modification taken as upon the line 10—10 of Fig. 2, looking in the direction of the arrows.

The invention is illustrated as applied to a spectacle temple of the non-metallic type, which is chosen to typify any ophthalmic mounting. The temple comprises a non-metallic member 2 provided at its forward end with a hinge plate 4, whereby it may be hinged to a spectacle-lens frame, and tapering from the forward end towards the rear end, as shown in Figs. 1–3. Spectacle temples of this type are in common use, but are comparatively heavy and clumsy, and rather thick at the rear end, to provide the necessary rigidity for holding the temple in place behind the ear. This is particularly true of skull temples of the character shown in Fig. 1, for the rear ends of skull temples are designed to engage, and hold firmly against, the skull, and this they can not do unless the non-metallic material is thick and of substantial proportions.

According to the present invention, however, the thickness of the rear end of the temple may be made small compared to that of the forward end, the required rigidity being attained by the use of a reinforcing member. To this end, the non-metallic member is constituted of a preferably seamless tube within the bore 6 of which is enclosed a reinforcing member 8, shown as a metal rod. A temple so constructed, though very thin at the rear end, will maintain any form into which it may be shaped, and will be strong enough to press firmly in and to hold against, the skull. The ends of the bore may be plugged with non-metallic plugs 10 and 12, effectually concealing the reinforcing member. The plugs may be integrally secured to the walls of the bore 6, as by the use of a solvent, or in any other desired manner.

The reinforcing rod 8 may be solid, as shown in Figs. 5, 8 and 9, or hollow, as shown at 14, Figs. 6 and 7. The hollow reinforcing rod may, if desired, be plugged with non-metallic material, and it may be provided with one or more openings through which the non-metallic material within and without the hollow reinforcing rod may be integrally joined together. The hollow construction adds to the lightness of the temple without detracting from its strength. If constituted of light-weight material like aluminum, however, the rod may advantageously be made solid, and this is the preferred construction. The reinforcing rod, whether solid or hollow, may have any desired cross section, round, Fig. 5, oval, not shown, semi-oval, Fig. 8, or triangular, Fig. 9, corresponding to the cross-sectional shape of the desired completed temple.

The better to lock the reinforcing rod 8, the hinge plate 4 and the non-metallic member 2 together, a screw or similar element 20 may be employed, extending through all three. If the hinge plate is provided with one or more suitable, beveled parts 22 projecting substantially at right angles to the plate and biting into and embedded within the non-metallic material, a single screw 20 will suffice for the purpose. The beveled projecting parts 22 crowd the non-metallic material into the channel formed between them. To prevent accidental turning of the screw, it may be provided with an irregularly shaped head 24 sunk into the non-metallic material of the member 2. As shown in Fig. 10, the reinforcing rod may be provided with a flat face 26, lying against, and in contact with, a flat face 28 of the hinge plate, effecting a very secure joint.

The member may conveniently be manufactured from a non-metallic tube 29, shown in dotted lines in Fig. 1, skived or otherwise flattened to provide a flat side or, preferably, two substantially parallel, flat sides shown at 30, Fig. 2, as extending substantially throughout the length of the tube. The tube is further reduced in thickness, as by skiving, to produce a tapered outer surface between the flat sides 30, as shown clearly in Figs. 1 and 3. The non-metallic material of the tube between the outer surface of the tube joining the flat sides and the bore tapers from the free end of the forward portion, where the hinge plate 4 is mounted, to near the free end of the rear portion. The thickness of the rear portion is thus made small compared to the thickness of the forward portion. The walls of the bore 6 are then softened, as by the use of alcohol or other solvent, after which the reinforcing rod is introduced. The rear portion of the tube, with the reinforcing rod enclosed thereon, is then bent into the required temple shape, as is illustrated in Figs. 1, 2 and 3. The hinge plate 4 is secured to one of the flat sides 30 at the forward end of the temple.

In temples of the type shown in Fig. 3, the tips of which are bent, as shown at 40, such bending would have a tendency to separate the plug 10, Figs. 1 and 2, from the end of the reinforcing rod, leaving an undesirable gap between them. To prevent this happening, the end of the reinforcing rod may be reduced in thickness at 42, Fig. 4, and the reduced end may be mounted within the bore of a bored plug 44. The reinforcing rod, with the plug 44 mounted thereon, is then introduced into the bore 6 of the non-metallic member, and the parts united together as shown described. Bending of the tip 40 of a temple so constructed will not cause separation of the parts. This construction may be employed also, if desired, in the skull temple of Figs. 1 and 2.

Other modifications will readily suggest themselves to persons skilled in the art, and all such are considered to be within the spirit and scope of the present invention, as defined in the appended claims.

What is claimed as new is:

1. A spectacle temple comprising a non-metallic tube having forward and rear ends, a reinforcing member enclosed within the bore of the tube, a hinge plate at the forward end of the temple, and means extending through the member and the hinge plate to secure them together, the rear end of the tube with the reinforcing rod enclosed therein being bent to the shape of a temple, the temple being adapted to be hinged at the forward end.

2. A spectacle temple as defined in claim 1 the hinge plate of which is flat and provided with one or more parts projecting substantially at right angles to the plate and biting into and embedded within the non-metallic material of the non-metallic member.

3. A spectacle temple comprising a non-metallic tube having forward and rear portions, a reenforcing member in the bore of the tube having a flat face, a hinge plate at the forward end provided with a flat face lying against and in contact with the flat face of the reenforcing member and having one or more parts projecting substantially at right angles to the plate and biting into and embedded within the non-metallic material of the non-metallic member, and means extending through the member and the hinge plate to secure them together, the rear end of the tube with the reinforcing member enclosed therein being bent to the shape of a temple, the temple being adapted to be hinged by means of the hinge plate.

4. A spectacle temple as defined in claim 1 the extending means of which is a screw having an irregularly shaped head sunk into the non-metallic material of the non-metallic member.

5. A spectacle temple comprising a non-metallic tube, a reinforcing member an end of which is reduced in thickness, a bored plug within the bore of which the reduced end is mounted, the reinforcing member with the plug mounted thereon being enclosed within the bore of the tube.

6. A spectacle temple comprising a non-metallic member having forward and rear portions and provided with a bore, a reinforcing rod in the bore, and a separate non-metallic plug inserted within the bore of the member at an end of the member and integrally secured to the walls of the bore, the rear portion of the member with the reinforcing rod therein being bent to the shape of a temple, and the temple being adapted to be hinged at the free end of the forward portion.

7. The method of making a spectacle temple that comprises inserting a reinforcing rod in the bore of a non-metallic member having a bore, inserting a separate non-metallic plug within the bore at an end of the member, integrally securing the plug to the walls of the bore, and bending the member with the reinforcing rod therein to the shape of a temple.

8. A spectacle temple comprising a non-metallic bored member having forward and rear portions, and a reinforcing rod enclosed within the bore of the member, the non-metallic material of the member between the outer surface of the member and the bore tapering from the forward portion to near the free end of the rear portion, whereby the thickness of the rear portion is small compared to the thickness of the forward portion, the rear portion of the member with the reinforcing rod enclosed therein being bent to the shape of a temple, and the temple being adapted to be hinged at the free end of the forward portion.

9. A spectacle temple comprising a seamless non-metallic tube having forward and rear portions, a reinforcing rod enclosed within the bore of the tube, the tube having a substantially flat side extending substantially throughout the length of the tube, the non-metallic material of the tube between the outer surface of the tube and the bore tapering from the free end of the forward portion to near the free end of the rear portion, whereby the thickness of the rear portion is small compared to the thickness of the forward portion, the rear portion of the tube with the reinforcing rod enclosed therein being bent to the shape of a temple, and the temple being adapted to be hinged at the free end of the forward portion.

10. A spectacle temple comprising a seamless non-metallic tube having forward and rear portions, and a reinforcing rod enclosed within the bore of the tube, the tube having two substantially parallel, flat sides extending substantially throughout the length of the tube, the non-metallic material of the tube between the outer surface of the tube joining the flat sides and the bore tapering from the free end of the forward portion to near the free end of the rear portion, whereby the thickness of the rear portion is small compared to the thickness of the forward portion, and a hinge secured to one of the flat sides at the forward end, the rear portion of the tube with the reinforcing rod enclosed therein being bent to the shape of a temple, and the temple being adapted to be hinged by means of the hinge.

In testimony thereof, I have hereunto subscribed my name this 29 day of Aug. 1921.

FREDERICK A. STEVENS.